United States Patent [19]
Bandel

[11] Patent Number: 5,359,274
[45] Date of Patent: Oct. 25, 1994

[54] ACTIVE OFFSET FOR POWER FACTOR CONTROLLER

[75] Inventor: Michael W. Bandel, Elk Grove Village, Ill.

[73] Assignee: North American Philips Corporation, New York, N.Y.

[21] Appl. No.: 932,839

[22] Filed: Aug. 20, 1992

[51] Int. Cl.$^5$ .......... G05F 1/70; G05F 1/565; H02M 7/5387
[52] U.S. Cl. .......... 323/207; 323/222; 363/132; 315/291; 315/DIG. 7
[58] Field of Search .......... 323/207, 222, 259; 363/16, 98, 124, 132; 315/247, 291, DIG. 7

[56] References Cited

U.S. PATENT DOCUMENTS

| | | | |
|---|---|---|---|
| 4,437,146 | 3/1984 | Carpenter | 363/21 |
| 4,683,529 | 7/1987 | Bucher, II | 323/207 X |
| 4,940,929 | 3/1990 | Williams | 323/222 |
| 5,006,975 | 4/1991 | Neufeld | 363/80 |

FOREIGN PATENT DOCUMENTS 0352983  1/1990  European Pat. Off. .

Primary Examiner—Emanuel T. Voeltz

[57] ABSTRACT

A switch mode power supply for a ballast having a power factor controller and providing a regulated D.C. output voltage. The controller is responsive to a control input signal which includes a sensed signal added to a varying offset. The sensed signal is representative of the current flow through a switching device of the power supply. The offset is varied based on the regulated D.C. voltage output.

25 Claims, 4 Drawing Sheets

FIG. 3

| PART | PART DESCRIPTION |
|---|---|
| $R_{1,21}$ | 392K, 1%, 1/4 W |
| $R_2$ | 2.37K, 1%, 1/8 W |
| $R_{3,29}$ | 100K, 5%, 1/2 W |
| $R_4$ | 10, 5%, 1/8 W |
| $R_5$ | 1.0, 5%, 1/4 W |
| $R_{6,7}$ | 470K, 5%, 1/4 W |
| $R_{8,24}$ | 953K, 1%, 1/4 W |
| $R_9$ | 10.0K, 1%, 1/8 W |
| $R_{10,26}$ | 200K, 5%, 1/4 W |
| $R_{11,16}$ | 51, 5%, 1/8 W |
| $R_{12}$ | 10K, 5%, 1/8 W |
| $R_{13,17}$ | 1.0K, 5%, 1/8 W |
| $R_{14,15}$ | 620, 5%, 1/4 W |
| $R_{20}$ | 25.5K, 1%, 1/8 W |
| $R_{22}$ | 22.1K, 1%, 1/8 W |
| $R_{23}$ | 300, 5%, 1/8 W |
| $R_{30}$ | 200K, 5%, 1/8 W |
| $R_{31}$ | 10K, 5%, 1/8 W |
| $R_{34}$ | 10K, 5%, 1/4 W |
| $R_{35}$ | 2.4K, 5%, 1/8 W |
| $C_1$ | 47NF, 20%, CLASS X |
| $C_2$ | 3.3NF, 20%, 3KVDC |
| $C_3$ | 47NF, 20%, CLASS X |
| $C_4$ | 0.27UF, 10%, 600VDC |
| $C_{5,6}$ | 27UF, 20%, 280VDC |
| $C_{7,13}$ | 47NF, 20%, 50VDC |
| $C_{10}$ | 1.2NF, 5%, 2KVDC |
| $C_{11}$ | 0.47UF, 10%, 250VDC |
| $C_{12}$ | 470PF, 20% 3KVDC |
| $C_{14}$ | 100UF, 20%, 35VDC |
| $C_{15}$ | 1.0NF, 20%, 50VDC |
| $C_{16}$ | 0.33UF, 10%, 50 VDC |
| $C_{17}$ | 1.0NF, 5%, 50 VDC, NPO |
| $C_{18}$ | 10NF, 20%, 50VDC |
| $C_{21}$ | 4.7UF, 20%, 25VDC |
| $C_{23}$ | 220PF, 20%, 1KVDC |

| PART | PART DESCRIPTION |
|---|---|
| $L_7$ | 4.3 MH |
| $L_1$ | 800UH IGNITOR CHOKE |
| $L_2$ | COM MODE CHOKE |
| $L_3$ | 22MM CHOKE, 2 WINDINGS |
| $L_{4-6}$ | 12UH CHOKE |
| $T_1$ | XFORMER, POT CORE |
| $D_{1-4}$ | 1A, 800 V |
| $D_5$ | 1.3A, 600V, FAST REC. |
| $D_6$ | 1.3A, 600V, FAST REC. |
| $D_7$ | 0.2A, 75V |
| $D_9$ | 0.2A, 75V |
| $D_{10}$ | 0.2A, 75V |
| $D_{11}$ | 12V, 0.5W |
| $D_{13-17}$ | 0.2A, 75V |
| $Q_1$ | 3.6A, 600V |
| $Q_2$ | 0.25A, 600V |
| $Q_{3,4}$ | 0.2A, 40V, NPN |
| $Q_5$ | 0.2A, 40V, PNP |
| $Q_{6,7}$ | 3.6A, 600V |
| $IC_1$ | MC33261D, S08 |
| $IC_2$ | 555, CMOS, S08 |
| $IC_3$ | TL431CLP, T092 |
| $F_1$ | 3A, 300V |

ACTIVE OFFSET FOR POWER FACTOR CONTROLLER

BACKGROUND OF THE INVENTION

This invention relates generally to power factor control circuitry for use with a lamp ballast, and more particularly to a power factor control circuit for use with a lamp ballast having an active offset.

Conventional power factor controllers such as model MC34261 and MC33261 available from Motorola Inc. of Phoenix, Ariz. are particularly designed for use in a switch mode power supply of an electronic ballast. The power supply serves to provide a regulated D.C. voltage to power the inverter (commutator) of the ballast.

Generally, the regulated D.C. voltage appears across one or more electrolytic capacitors of the power supply or inverter of the ballast. During no-load or light load conditions of the ballast, that is, when there is substantially no lamp load to draw an appreciable amount of current from the one or more electrolytic capacitors, overcharging of the one or more electrolytic capacitors can occur. Such overcharging makes it more difficult to regulate the D.C. voltage and can damage the capacitor(s) as well as other components (e.g. transistors) of the inverter.

Overcharging of the one or more electrolytic capacitors during no-load conditions (which typically occur during pre-ignition of the ballast or when the load becomes disconnected from the ballast) can be minimized by turning a switch of the switch mode power supply OFF more quickly to minimize the amount of energy transferred to the electrolytic capacitor(s). In other words, the excessive build up of charge across the one or more capacitors during no-load and light load conditions can be substantially eliminated by turning the switch OFF more quickly.

The power factor controller determines when to turn the switch OFF based, in part, on a current sensed signal representative of the current flow through the switch. This signal is fed into a current sensed input of the controller. In order to increase the speed at which the switch turns OFF thereby minimizing potential overcharge of the electrolytic capacitor(s), a passive (i.e. constant) offset is added to the current sensed signal.

The enhanced sensitivity of the power factor controller to no-load and lightly loaded conditions through provision of a constant offset results in a higher switching frequency of the switch-mode power supply. The amount of energy transferred to the electrolytic capacitor(s) is reduced thereby avoiding an excessive build up of charge across the latter. The constant offset, however, can also reduce the power factor of the ballast and, in particular, leads to a higher than desired total harmonic distortion (THD) level in current drawn by the ballast.

Accordingly, it is desirable to provide a power factor controller which is sensitive to no-load and light load conditions of the lamp ballast to prevent overcharging of the electrolytic capacitor(s) while minimizing the THD level in current drawn by the ballast.

SUMMARY OF THE INVENTION

Generally speaking, in accordance with a first aspect of the invention, a switch mode power supply includes a current source for supplying current to at least one capacitor for providing an output voltage, a switching device for conditioning current supplied to the output, a controller responsive to a control signal for controlling conditioning by the switching device of current supplied to the at least one capacitor and sensing circuitry for producing the control signal. The control signal includes a sensed signal representing current flow through the switching device and a varying (active) offset based on the output voltage. In accordance with this aspect of the invention, the current source includes a choke responsive to the switching device for supplying current to the output.

By providing an active rather than a passive offset as part of the control signal, the switching device is turned OFF much more quickly. The offset is only of a sufficient magnitude to significantly affect the speed at which the switching device turns OFF during no load conditions resulting in a lower THD while preventing overcharging of the one or more capacitors at the output of the switch mode power supply. Through enhanced sensitivity to no-load conditions, the switch mode power supply is able to maintain a relatively high constant power factor.

In accordance with a second aspect of the invention, a preconditioner for regulating a D.C. voltage includes a current source for producing current, an output responsive to current and across which the regulated D.C. voltage is applied, a switching device for diverting current away from the output, a controller responsive to a control signal for controlling the switching device and sensing circuitry for producing the control signal. The control signal includes a sensed signal representing current flow through the switching device and a varying (active) offset based on the regulated D.C. voltage. For the same reasons as discussed above, this active offset overcomes the drawbacks of conventional preconditioners which either have no offset (i.e. cannot quickly turn the switch OFF resulting in an undesirably high output voltage, for example, of about 660 volts) or a passive (constant) offset (i.e. THD level being too high). In accordance with this second aspect of the invention, the sensing circuitry includes a zener diode device having a cathode which varies between a low voltage and a high voltage level based on the regulated D.C. voltage at the output.

In accordance with yet another aspect of the invention, a ballast includes a power factor controller responsive to a control signal for controlling the power factor of the ballast and sensing circuitry for producing the control signal which includes a sensed signal added to a varying (active) offset. The active offset varies between a low level and a high level wherein the high level is approximately at least five times greater magnitude than the low level, Accordingly, it is an object of the invention to provide an improved switch mode power supply for a ballast which substantially avoids overcharging of one or more capacitors placed across the output of the power supply and which also minimizes the THD level of current drawn by the ballast.

It is another object of the invention to provide an improved switch mode power supply having a power factor controller which is responsive to an active offset based on the output voltage of the power supply in maintaining a relatively high power factor for the ballast.

It is yet another object of the invention to provide an improved switch mode power supply with enhanced sensitivity to no load conditions in regulating the D.C. voltage output of the power supply.

Still other objects and advantages of the invention will, in part, be obvious and will, in part, be apparent from the specification.

The invention accordingly comprises several steps in a relation of one or more of such steps with respect to each of the others, and the device embodying features of construction, a combination of elements and arrangement of parts which are adapted to effect such steps, all as exemplified in the following detailed disclosure. The scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a tabular description of the ballast circuit components of FIG. 2;

DETAILED DESCRIPTION OF THE PREFERRED EMBODIMENT

Figure 1:
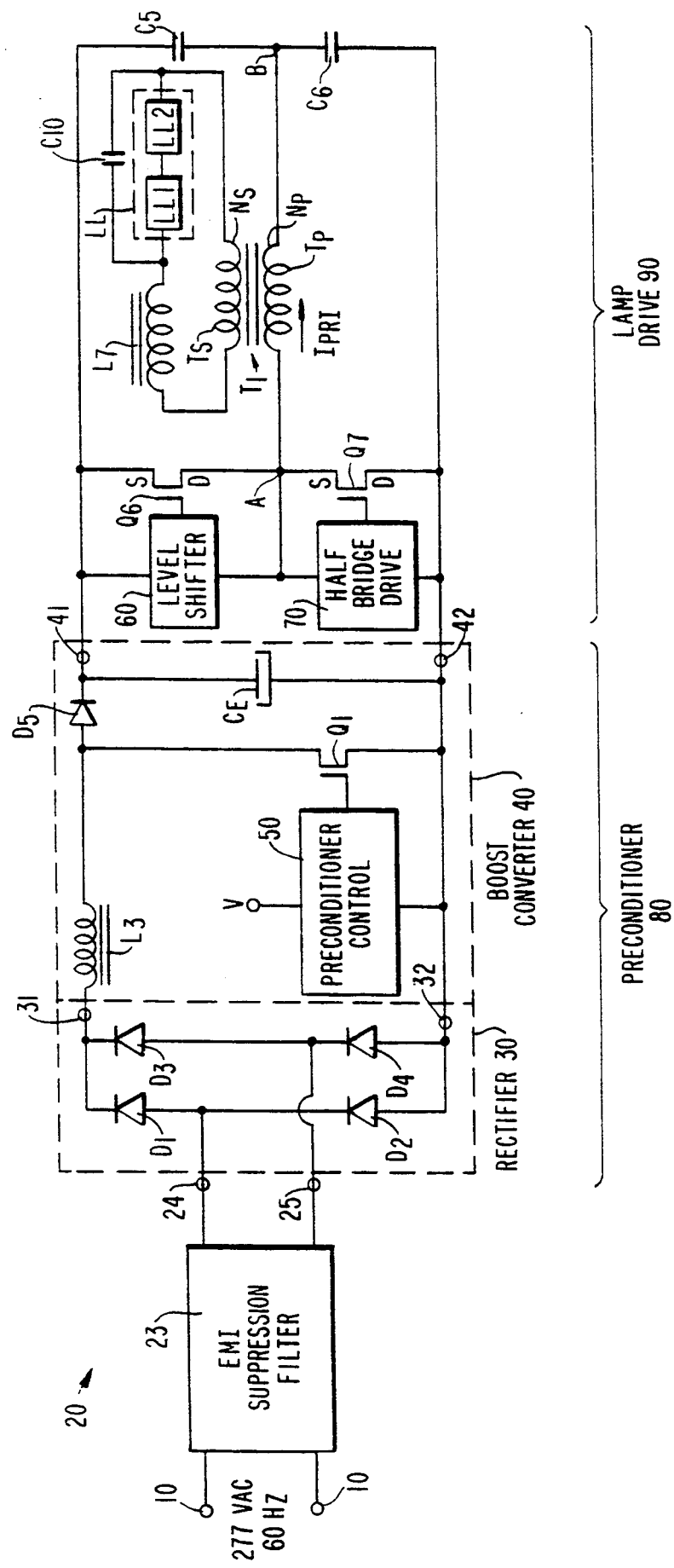
FIG. 1 is a schematic diagram of a ballast circuit in accordance with the invention.

As shown in FIG. 1, a ballast circuit 20 includes an electromagnetic interference (EMI) suppression filter 23. Filter 23 has a pair of input terminals 10 to which an A.C. voltage such as, but not limited to, 277 volts, 60 hertz is applied. Filter 23 filters high frequency components inputted thereto so as to reduce conducted and radiated EMI. The output of filter 23, provided at a pair of terminals 24 and 25, is supplied to a full wave rectifier 30 which includes diodes $D_1$, $D_2$, $D_3$ and $D_4$. The anode of diode $D_1$ and cathode of diode $D_2$ are connected to terminal 24. The anode of diode $D_3$ and cathode of diode $D_4$ are connected to terminal 25. The output of rectifier 30 (i.e. rectified A.C. voltage at a pair of output terminals 31 and 32 is supplied to a boost converter 40. The cathodes of diodes $D_1$ and $D_3$ are connected to terminal 31. The anodes of diodes $D_2$ and $D_4$ are connected to terminal 32.

Converter 40 boosts the magnitude of the rectified A.C. voltage supplied by rectifier 30 and produces at a pair of output terminals 41 and 42 a regulated D.C. voltage supply. Boost converter 40 includes a choke L3, a diode $D_5$ the anode of which is connected to one end of choke L3. The other end of choke L3 is connected to output terminal 31 of rectifier 30. The output of boost converter 40 at output terminals 41, 42 is applied across an electrolytic (boosting) capacitor CE, one end of which is connected to the cathode of diode $D_5$. A transistor (switch) Q1 is connected to the junction between choke L3 and the anode of diode $D_5$. The other end of transistor Q1 is connected to the junction between the other end of capacitor CE, output terminal 32 of rectifier 30 and output terminal 42.

A preconditioner control 50, which is powered by a D.C. supply voltage V, controls the switching duration and frequency of transistor Q1. Preconditioner control 50 is preferably, but not limited to, a Motorola MC33261 Power Factor Controller Integrated Circuit from Motorola Inc. of Phoenix, Ariz. Transistor Q1 is preferably a MOSFET, the gate of which is connected to preconditioner control 50. Rectifier 30 and boost converter 40, including preconditioner control 50, form a preconditioner 80 (switch mode power supply) for ballast circuit 20. Output terminals 41 and 42 of boost converter 40 also serve as the output for preconditioner 80 across which a regulated D.C. voltage is produced.

A lamp drive 90, which is supplied with the regulated D.C. voltage outputted by preconditioner 80, includes a half-bridge inverter controlled by a level shifter 60 and a half-bridge drive 70. The half-bridge inverter includes a pair of transistors Q6 and Q7, which serve as switches, a pair of capacitors C5 and C6 and a transformer T1. Preferably, but not necessarily, half-bridge drive 70 produces a square wave driving signal to drive transistor Q7 and has a 50—50 duty cycle. Level shifter 60 inverts the driving signal supplied to transistor Q7 for driving transistor Q6. The driving signals produced by level shifter 60 and half-bridge drive 70 are approximately 180° out of phase with each other so as to prevent conduction of transistors Q6 and Q7 at the same time.

A source S of transistor Q6 and one end of level shifter 60 are connected to output terminal 41 of boost converter 40. A drain D of transistor Q6 is connected to a terminal A. The other end of level shifter 60, one end of half-bridge drive 70 and a source S of transistor Q7 are also connected to terminal A. The other end of half-bridge drive 70 and a drain D of transistor Q7 are connected to output terminal 42 of boost converter 40. Capacitor C5 is connected at one end to output terminal 41. The other end of capacitor C5 and one end of capacitor C6 are connected to a terminal B. The other end of capacitor C6 is connected to output terminal 42.

A primary winding Tp of transformer T1 is connected to terminals A and B. A secondary winding TS of transformer T1 is connected at one end to an inductor L7, the latter of which generally represents either the leakage inductance of transformer T1 or a discrete choke. Connected to the other end of inductor L7 is one end of a capacitor C10 and one end of a lamp load LL. Lamp load LL can include any combination of lamps and is shown, but not limited to, the series combination of two fluorescent lamps LL1 and LL2. The other ends of capacitor C10 and lamp load LL are connected to the other end of secondary winding Ts.

The turns ratio between primary winding Tp and secondary winding Ts of transformer T1 is $N_p/N_s$. Transformer T1 electrically isolates the lamp load LL from the output voltage produced by preconditioner 80 and provides sufficient open circuit voltage during pre-ignition to ignite lamp load LL.

The inductance of inductor L7 is based on the desired current flow through lamp load LL once the latter has ignited and is in its steady-state mode of operation. The D.C. voltage across each capacitor C5 and capacitor C6 is approximately half the output voltage of preconditioner 80.

In accordance with one embodiment of the invention, a turns ratio $N_s/N_p$ is about 1.5, inductor L7 is approximately 4.3 millihenries, capacitor C10 is about 1.2 nanofarads, and capacitors C3 and C4 are about 0.33 microfarads, nominally rated at 630 volts. Both lamp LL1 and lamp LL2 are 40 watt low pressure mercury vapor tubular fluorescent lamps. The fundamental frequency of the square wave produced by the half-bridge inverter is approximately 28KHz. The resonant frequency of inductor L7 and capacitor C10 is approximately 70KHz, that is, approximately 2.5 times a fundamental frequency f1 of the square wave voltage across terminals 41 and 42. A more detailed description of the values and components of FIG. 1 is shown and described below with respect to FIGS. 2 and 3.

The output of the half-bridge inverter, which is across terminals A-B, forms a substantially square wave voltage train. For exemplary purposes only, the no-load condition will be discussed hereinafter with respect to pre-ignition conditions, it being understood that no-load conditions also occur whenever either end of lamp load LL is not connected to lamp drive 90. It is also to be understood that no-load conditions as used herein include, but are not limited to, light load conditions such as occur during pre-ignition of lamp load LL. Inductor L7 and capacitor C10 form an L-C series connected circuit. Lamp load LL appears as a substantially open circuit (i.e. no-load condition) drawing substantially no power except for filament heating (assuming lamps LL1 and LL2 are fluorescent lamps of, for example, the rapid-start type).

During no-load conditions, a voltage $V_{AB}$, that is, the voltage between terminals A and B forms a square wave voltage train which is applied across primary winding Tp varying between approximately +240 volts and −240 volts. A current $I_{PRI}$ flowing through primary winding Tp during no-load conditions, that is, prior to ignition of lamp load LL, has a peak value of approximately ±400 milliamperes. Once lamp load LL is ignited and is in its steady-state operation, current $I_{PRI}$ flowing through primary winding Tp has a somewhat sinusoidal wave shape with a peak value of approximately ±800 milliamperes. Capacitor C10 serves to smooth this somewhat sinusoidal current waveform resulting in a substantially sinusoidal lamp current $I_{LAMP}$ having a peak value of approximately ±380 milliamperes.

Inductor L7 serves as the lamp current ballasting element. Capacitor C10, which is placed across lamp load LL, provides a more sinusoidal open circuit voltage and keeps total half bridge current inductive while also lowering higher harmonic content of current flowing through lamp load LL. Inductor L7 and capacitor C10 together form a series connected L-C output circuit. The value for capacitor C10 is chosen such that safe open circuit operation is provided. Accordingly, no additional circuits to protect lamp drive circuit 90 are required.

When ballast circuit 20 is first turned on, prior to the voltage being boosted by preconditioner 80, the input voltage of approximately 277 volts results in a square wave voltage of approximately 390 volts peak to peak being applied across primary winding Tp of transformer T1, which is stepped up to approximately 570 volts peak to peak across secondary winding TS. During this time the lamp cathodes are heated. After approximately 0.5 seconds, preconditioner 80 turns ON resulting in a regulated D.C. voltage of approximately 480 volts across output terminals 41, 42 of boost converter 40 and a voltage of approximately 700 volts peak to peak across secondary winding TS, the latter voltage being sufficient for igniting lamp load LL. Once lamp load LL is ignited (i.e. during steady-state lamp operation), the lamp voltage (i.e. voltage across lamp load LL) drops to approximately ±300 volts peak with the remainder of the secondary winding TS output voltage across inductor L7. The number of and connections between the lamps within lamp load LL can be varied as desired with the value of inductor L7 being chosen so as to provide the desired lamp current $I_{LAMP}$ during steady-state operation of lamp load LL.

During no-load conditions electrolytic capacitor CE can overcharge resulting in damage to electrolytic capacitor CE as well as other components in the lamp drive 90 such as, but not limited to, transistors Q6 and Q7. The overcharged state of electrolytic capacitor CE arises from choke L3 pumping (supplying) too much current (energy) to electrolytic capacitor CE. The amount of current supplied to electrolytic capacitor CE by choke L3 is determined by the switching duration and frequency of transistor Q1 which in turn is controlled by preconditioner control 50. It is therefore essential, as provided by the present invention and further discussed below, that preconditioner control 50 be extremely sensitive to no-load conditions in order to prevent the voltage across electrolytic capacitor CE from reaching unsafe levels and without drawing a ballast current having an undesirable THD level (i.e. maintaining an acceptably high power factor).

Figure 2:
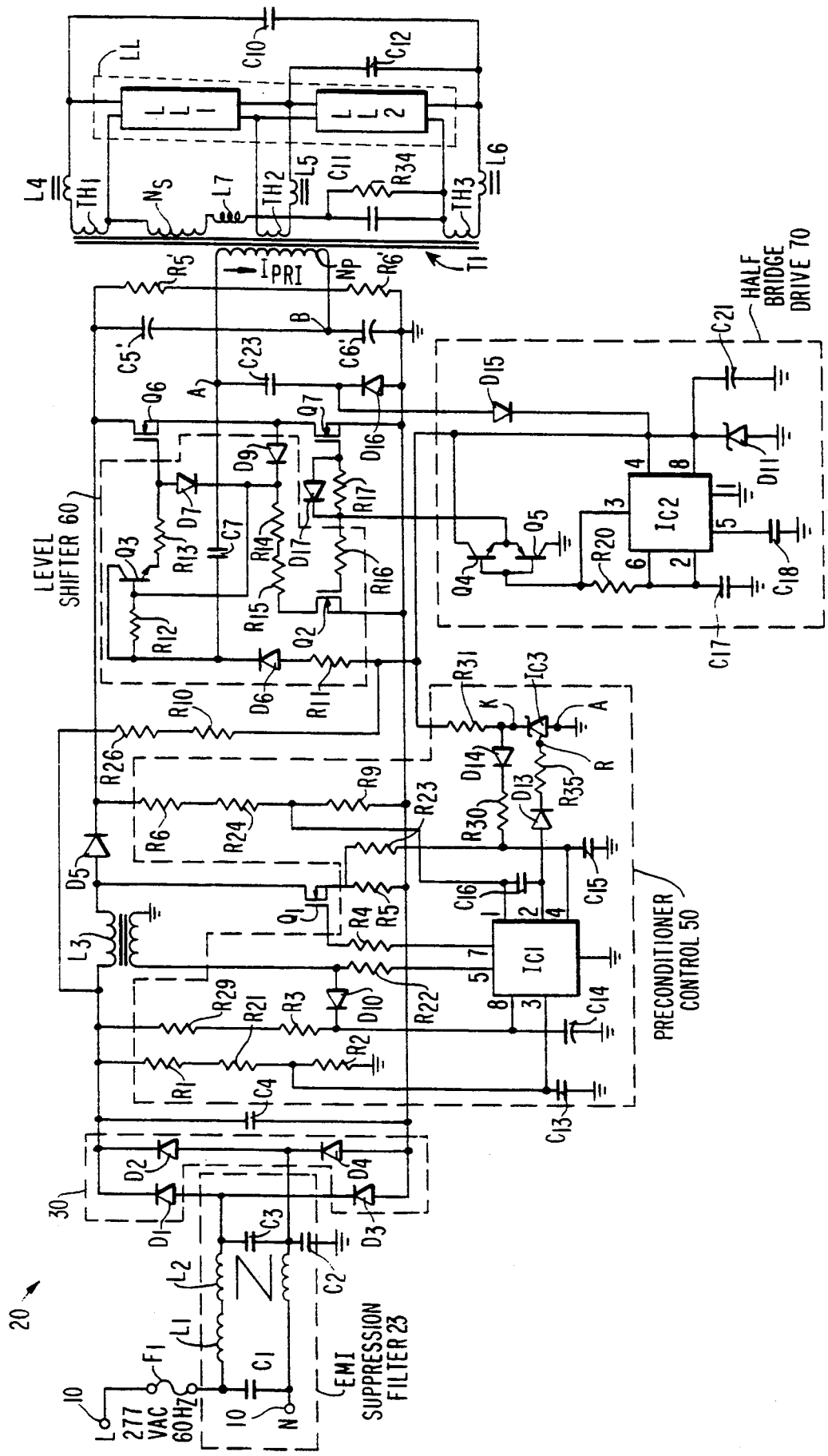
FIG. 2 is a more detailed schematic diagram of FIG. 1.

A more detailed schematic diagram of ballast circuit 20 including the construction of EMI suppression filter 23, preconditioner control 50, level shifter 60 and half-bridge drive 70 is shown in FIG. 2. The values for and description of the components shown in FIG. 2 are tabularly listed in FIG. 3.

Referring now to FIG. 2, EMI suppression filter 23 includes a fuse F1 connected to the line (L) side of the 277 volt A.C. line, a capacitor C1 connected between fuse F1 and the neutral (N) side of the 277 volt A.C. line and two filters. The A.C. voltage ($V_{LN}$) of 277 volts between line and neutral is shown for exemplary purposes only and is not limited thereto. The first filter rejects normal mode signals. The second filter rejects common mode signals. These two filters include, in part, a normal mode inductor L1 and a ballast transformer L2 for common mode rejection. Across the line is a capacitor C3 which is used as part of a normal mode filter of inductor L1. A capacitor C2, connected from neutral to ground, serves as a common mode capacitor and is part of the common mode rejection filter.

Referring once again to FIG. 1, the rectified A.C. (i.e. pulsating D.C.) signal supplied to preconditioner 80 from diode bridge rectifier 30 is boosted in magnitude by choke L3 and diode D5 to charge capacitors CE, C5 and C6. In FIG. 1, capacitor CE is separate from capacitors C5 and C6, capacitor CE being a large electrolytic capacitor in the range of 5 to 100 microfarads. Capacitors C5 and C6 are high frequency bridge capacitors. Since capacitor CE is in parallel with the series combination of capacitors C5 and C6, these three capacitors can be reconfigured as capacitors C5' and C6' as shown in FIG. 2. The potential overvoltage condition of capacitor CE of FIG. 1 should therefore be viewed as the potential overvoltage condition of capacitors C5' and C6' of FIG. 2 which is addressed by the present invention as discussed below.

Rectifier 30 is constructed similar to and with the same elements as shown in FIG. 1. Preconditioner control 50 includes a preconditioner integrated circuit (IC) chip IC1 operating in an asynchronous mode (i.e. not in synchronism with the A.C. voltage ($V_{LN}$) inputted to ballast circuit 20). Chip IC1 has four control input signals.

The first control input signal flows into pin 3 of chip IC1 from the rectified A.C. line through a resistor divider network including three resistors R1, R21, and R2 and a capacitor 13. This first control input signal represents the rectified A.C. voltage signal as an input to chip IC1.

The second control input signal flows into pin 5 of chip IC1, and represents the current flow of choke L3. This second control input signal is used to turn ON transistor Q1 when the current flow through choke L3 is about zero. Chip IC1, responsive to the second control input signal, produces a driving signal at pin 7 and through a resistor R4 to turn ON transistor Q1.

The third control input signal is based on a resistor divider formed from resistors R6, R24 and R9, enters chip IC1 at pin 1 and is filtered by a capacitor C16. The third control input signal is a D.C. feedback signal to chip IC1 and represents the D.C. level across the output of preconditioner 80.

The fourth control input signal represents current passing through transistor Q1 and is determined based on resistor R5 which monitors all currents to Q1. At the junction between a resistor R23 and a capacitor C15, which serves as a lowpass filter, the fourth control input signal is fed into pin 4 of chip IC1. Responsive to a combination of the first, third and fourth control input signals, chip IC1 turns OFF transistor Q1 through the signal produced at pin 7 of chip IC1.

Preconditioner control 50 also includes an active offset circuit having an integrated circuit chip IC3, three resistors R30, R31 and R35 and a pair of diodes D13 and D14 which together limit the peak amplitude of the D.C. voltage across capacitors C5′ and C6′ at the time ballast 20 is turned ON, during operation of ballast 20 before lamp ignition and whenever ballast 20 is otherwise under a no-load (including light load) condition. This portion of preconditioner control 50 functions as a comparator which injects an active D.C. offset current (further discussed below) into pin 4 of chip IC1 when the voltage at pin 2 of chip IC1 drops below a threshold level.

Preconditioner 80 is an up-converter and boosts the rectified A.C. input voltage as follows. When transistor Q1 (which serves as a switch) is closed, choke L3 is short circuited to ground. Current flows through choke L3. Transistor Q1 is then opened (turned OFF). Choke L3 with transistor Q1 open transfers (pumps) stored energy (current) through diode D5 into capacitor CE of FIG. 1 or capacitors C5′ and C6′ of FIG. 2. The amount of energy transferred to capacitor CE of FIG. 1 or capacitor C5′ and C6′ of FIG. 2 is based on the time during which transistor Q1 is turned ON, that is, based on the frequency and duration of the driving signal supplied to the gate of transistor Q1 through resistor R4 by chip IC1. Asynchronous operation of transistor Q1, with respect to voltage $V_{LN}$ results.

Choke L3 operates in a discontinuous mode, that is, the current through choke L3 during each cycle is reduced to substantially zero before a new cycle is initiated. The frequency at which transistor Q1 is turned ON and OFF is varied by preconditioner control 50 so that the peak current through choke L3 is kept constant as set by resistor R5 (in FIG. 2). The D.C. voltage across capacitors C5′ C6′ (in FIG. 2) is kept constant so as to prevent these capacitors from overcharging and is set by the feedback network of resistors R6, R24 and R9 and capacitor C16. Resistors R26 and R10 are connected to the input of choke L3 and provide a D.C. bias as the initial power supply for half bridge drive 70 and an integrated circuit chip IC2 and as the bias for chip IC3 through resistor R31. Chip IC2 of half bridge drive 70 is a CMOS 555 timer which can be turned ON with a very low D.C. current in the order of 1 milliamp supplied via resistors R26 and R10.

Once the half-bridge inverter is operating, the low voltage (snubber) power supply for chip IC2 is provided to chip IC2 through a pair of capacitors C21 and C23, a pair of diodes D16 and D15 and a zener diode D11. Chip IC2 has a limited output drive capacity. To increase this capacity, a pair of transistors Q4 and Q5 are used to help drive both half-bridge drive 70 and level shifter 60. A square wave signal from chip IC2 via transistors Q4, Q5 is supplied through resistor R17 and diode D17 to the gate of transistor Q7. Diode D17 in parallel with resistor R17 operates as a fast turnoff diode for quick discharge at the gate of transistor Q7. Resistor R17 and the internal gate capacitance of transistor Q7 provide a delay for turning ON transistor Q7. A controlled turn ON and a quick turn OFF of transistor Q7 is therefore provided. The signal present at the emitters of transistors Q4 and Q5 is also used to drive transistor Q2 of level shifter 60.

Level shifter 60 operates as follows: When transistor Q7 is turned ON, capacitor C7 is connected to ground through transistor Q7. Capacitor C7 is charged through resistor R11 and diode D6 from the low voltage power supply of chip IC2 (i.e. junction of zener diode D11 and capacitor C21). During the period of time that transistor Q7 is turned ON, capacitor C7 becomes fully charged to the low voltage power supply voltage. Concurrently, the gate of transistor Q6 has been pulled to ground potential by diode D7, resistors R14 and R15 and transistor Q2.

Transistor Q2 can be viewed as being in parallel with transistor Q7 so that transistors Q2 and Q7 are turned ON and turned OFF at the same time. When transistors Q2 and Q7 are turned OFF, the stored charge of transistor Q7 is applied at the junction of the source of transistor Q6 and the drain of transistor Q7. This junction is now charged to the low voltage power supply. Resistor R12 quickly turns on the base of transistor Q3 so that charge can be transferred from capacitor C7 into the gate capacitance of transistor Q6 through transistor Q3 and resistor R13. Transistor Q6 is turned ON permitting current to flow therethrough.

Transistors Q6 and Q7 have internal diodes (not shown). These diodes, which can either be internal or external to the transistors, permit inductive currents to flow through transistors Q6 and Q7 at the initial turn ON and turn OFF of transistors Q6 and Q7.

Preferably, capacitors C5′ and C6′ are electrolytic capacitors having a pair of discharge resistors R5′ and R6′ in parallel, respectively. Transformer T1 is a leakage transformer, that is, having a leakage inductor of inductance $L_M$ (not shown) which serves as the ballast for lamp load LL (i.e. to limit steady state current flow through the lamp load). Alternatively, when transformer T1 has little or no leakage inductance an external inductor L7 of inductance $L_M$ is required for ballast purposes. Three windings $T_{H1}$, $T_{H2}$ and $T_{H3}$ provide the necessary current for heating the filaments of lamps LL1 and LL2 during ignition and steady state operation. In series with windings $T_{H1}$, $T_{H2}$ and $T_{H3}$ are inductors L4, L5 and L6, respectively, for limiting the current in the lamp filaments.

Transformer T1 has a main secondary winding $T_M$. A resonant capacitor C10 is in series with inductor L7 and reflects back to the primary winding of transformer T1 as a series LC combination across the half-bridge inverter. A capacitor C11 serves as a D.C. blocking capacitor to prevent rectification if this should occur within the lamp load. In parallel with capacitor C11 is a resistor R34 for discharge of capacitor C11 should rectification occur. Blocking capacitor C11 has substantially no ballast function (i.e. to limit steady state current flow through the lamp load) and typically has a minimal voltage drop in the order of several volts. A capacitor C12 serves as a bypass capacitor for lamp LL2 and is used during lamp starting as part of a normal lamp sequence starting scheme.

In accordance with the invention, an active offset is supplied to the current sense input (pin 4) of chip IC1. Referring once again to FIG. 2, by providing the active offset, chip IC1 is more responsive to no-load conditions by more quickly turning transistor Q1 OFF and thereby increasing the switching frequency of transistor Q1. The increased frequency limits the amount of energy which can be stored by choke L3 and transferred by choke L3 to electrolytic capacitor CE of FIG. 1 and capacitors C5' and C6' of FIG. 2.

Figure 4:
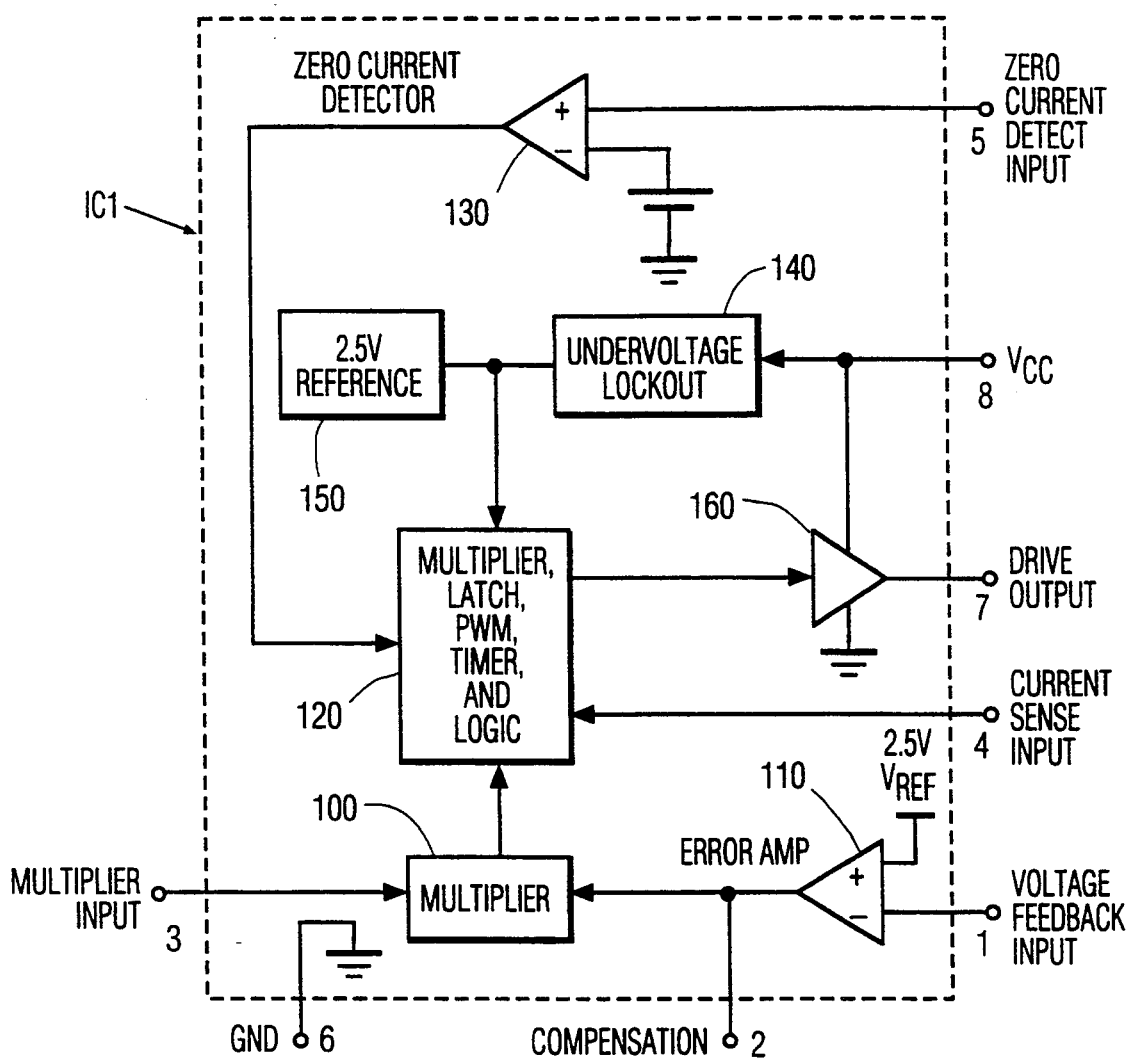
FIG. 4 is a block diagram of a conventional power factor controller.

FIG. 4 is a block diagram of chip IC1 which is well known in the art and readily available from Motorola, Inc. of Phoenix, Ariz. under part numbers MC34261 and MC33261 Power Factor Controller. Chip IC1 determines when to turn transistor Q1 OFF based on control inputs to pins 1, 3 and 4. Pin 3 receives a signal representing the rectified A.C. voltage which is supplied to a multiplier 100 of chip IC1.

The D.C. voltage signal supplied to the voltage feedback input (pin 1) of chip IC1 is fed into an inverting input of an error amplifier 110 of chip IC1. The non-inverting input of error amplifier 110 is connected to a 2.5 volt reference. Consequently, whenever the voltage across capacitors C5' and C6' is too high, (i.e. overcharged), the output of error amplifier 110 will decrease. This output is supplied to multiplier 100 and is outputted at pin 2 of chip IC1 as a compensating signal. As particularly shown in FIG. 2, capacitor C16 is connected between pins 1 and 2 of chip IC1. Consequently, when the output voltage of error amplifier 110 decreases, the compensating signal outputted at pin 2 is fed back through capacitor C16 to the inverting input of error amplifier 110 in order to maintain the voltage at pin 1 of error amplifier 110 at approximately 2.5 volts. Similarly, when the voltage across capacitors C5' and C6' is lower than desired, the compensating signal into pin 1 will raise the inverting input (pin 1 voltage) of error amplifier 110 to approximately 2.5 volts.

The output of multiplier 100 represents a combination of the rectified A.C. voltage inputted to and the D.C. voltage outputted by preconditioner control 50. The output of multiplier 100 is supplied to a multiplier, latch, PWM (pulse width modulator), timer and logic circuit 120. Circuit 120 also receives signals from a current sense input (pin 4), a zero current detect input (pin 5) through a zero current detector 130 and a D.C. source voltage $V_{cc}$ inputted at pin 8 of the chip IC1. The D.C. source $V_{cc}$ prior to being coupled to circuit 120 is processed by an undervoltage lockout 140 and a 2.5 voltage reference 150. The output of circuit 120 is applied as a drive output to pin 7 through an amplifier 160.

As shown in FIG. 2, pin 4 of chip IC1 (i.e. the current sense input) receives a signal having two components, that is, a signal representing current flow through transistor Q1 (i.e. current flowing through resistor R23) and an active offset (i.e. current flowing through diode $D_{14}$ and resistor R30). The active offset is determined by the voltage at a cathode K of chip IC3. Cathode K voltage in turn is determined by the compensating voltage outputted at pin 2 of chip IC1. The compensating voltage reflects the voltage across capacitor CE of FIG. 1 or across capacitors C5', C6' of FIG. 2 (i.e. voltage output of preconditioner 80). As the voltage across capacitor CE of FIG. 1 or capacitors C5', C6' of FIG. 2 rises beyond a predetermined level (e.g. overcharges), cathode K voltage changes from a low level of about 2 volts to a high level of about 11 volts. Cathode K voltage is therefore directly proportional to the output voltage of preconditioner 80 (i.e. cathode voltage rises and lowers as the voltage output of preconditioner 80 rises and lowers, respectively).

In other words, only when the voltage across capacitor CE of FIG. 1 or capacitors C5', C6' of FIG. 2 rises beyond a predetermined level does the cathode K voltage of chip IC3 assume a sufficient magnitude resulting in a sufficient offset (current flow) inputted at pin 4 of chip IC1 to significantly increase the speed at which transistor Q1 turns OFF. The more quickly transistor Q1 turns OFF, the smaller the build up of energy stored within choke L3. Transfer of a limited amount of stored energy by choke L3 to capacitor CE of FIG. 1 or capacitors C5', C6' of FIG. 2 precludes the overcharge of such capacitors.

As compared to conventional power factor controllers which provide a passive (i.e. constant) offset inputted to pin 4 of chip IC1, the active offset in accordance with the invention is of a substantial magnitude only when the voltage across capacitor CE of FIG. 1 or capacitors C5', C6' of FIG. 2 is above a predetermined level (e.g. overcharged). The active offset is of a substantial magnitude only during no-load (including extremely light load) conditions inasmuch as overcharge conditions of capacitor CE of FIG. 1 and capacitors C5', C6' of FIG. 2 do not occur during normal steady state operation of ballast 20.

Figure 5:
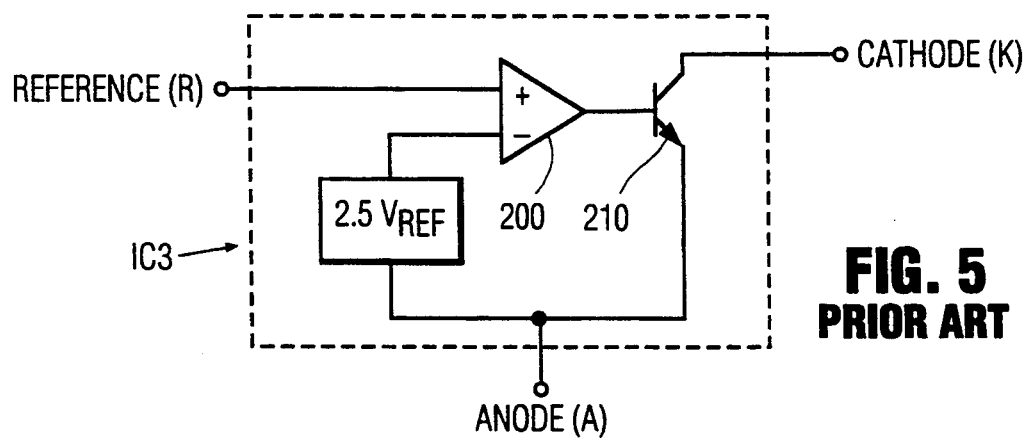
FIG. 5 is a block diagram of a conventional integrated circuit serving as a zener diode.

As shown in FIGS. 2 and 5, cathode K voltage of chip IC3 is determined based on the input voltage applied to a reference R terminal of chip IC3. More particularly, chip IC3 includes a comparator 200 having a non-inverting input to which reference R is connected and an inverting input fed by a 2.5 voltage reference. An anode A terminal of chip IC3 is grounded. The output of comparator 200 is connected to the base of an NPN transistor 210. The collector of transistor 200 is connected to cathode K terminal of chip IC3.

When the voltage applied to reference R is equal to or less than 2.5 volts, transistor 210 is turned OFF. Conversely, when the voltage applied to input R is greater than 2.5 volts, transistor 210 is turned ON. When the voltage across capacitors C5' and C6' is too high (e.g. overcharged during no-load conditions), the compensating voltage outputted at pin 2 of chip IC1 will be less than 2.5 volts. Transistor 210 will be turned OFF. The voltage at cathode K of chip IC3 will be approximately 11 volts resulting in a current flow (offset) of between 40–60 microamperes flowing through resistor R30 into pin 4 of chip IC1. The current flowing through resistor R30 significantly offsets the sensed current flowing into pin 4 of chip IC1 through resistor R23 (i.e. representing the current flow through transistor Q1) resulting in quick turn OFF of transistor Q1.

During normal operation of ballast 20 following ignition of lamp load LL (i.e. steady state operation), the compensating voltage at pin 2 of chip IC1 turns ON transistor 210 of chip IC3. The voltage at cathode K of chip IC3 drops to approximately 2 volts resulting in an offset of approximately 10 microamperes flowing through resistor R30. The speed at which transistor Q1 is turned OFF is not significantly affected based on such a low offset.

By providing a substantial offset only during no-load conditions, chip IC1 enhances (increases) sensitivity to no-load output conditions of preconditioner 80. The invention, by recognizing that overcharge conditions across capacitor CE of FIG. 1 and capacitors C5' and C6' of FIG. 2 occur primarily (and normally only) during no-load conditions of ballast 20, provides only a substantial offset during no-load conditions. Consequently, overcharging of capacitor CE of FIG. 1 and capacitors C5' and C6' of FIG. 2 is substantially avoided. By not providing a constant, passive offset, the THD of ballast 20 is substantially reduced as compared to conventional ballasts which incorporate a passive offset in combination with a power factor controller. In particular, by providing an active rather than a passive offset to chip IC1 (i.e. power factor controller), transistor Q1 switches OFF much more quickly only during no-load conditions resulting in an overall lower THD while preventing capacitor CE of FIG. 1 and capacitors C5' and C6' of FIG. 2 from overcharging. Through the enhanced sensitivity to no-load conditions, ballast 20 is able to maintain a relatively constant power factor ranging from about 0.96 to about 0.99. Preferably, although not necessarily, the active offset limits the voltage across preconditioner 80 output to about 525–550 volts whereas without any offset this voltage can rise to about 660 volts.

It will thus be seen that the objects set forth above and those made apparent from the preceding description are efficiently attained and, since certain changes can be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which as a matter of language, might be said to fall therebetween.

What is claimed is:

1. A switch mode power supply, comprising:
   a current source for producing current;
   output means responsive to said current for providing an output voltage;
   switch means for conditioning current supplied to said output means;
   control means responsive to a control signal for controlling conditioning by said switch means of current supplied to said output means; and
   sensing means for producing said control signals, said control signal including a sensed signal representing current flow through said switch means and a varying offset based on the output voltage of said output means.

2. The switch mode power supply of claim 1, wherein said current source includes inductor means controlled by to said switch means for supplying the current to said output means.

3. The switch mode power supply of claim 1, wherein said output means includes at least one capacitor across which said output voltage is developed.

4. The switch mode power supply of claim 1, wherein said control means comprises a power factor controller serving to control the power supply power factor.

5. The switch mode power supply of claim 2, wherein said control means comprises a power factor controller serving to control the power supply power factor.

6. In a ballast for a discharge lamp, a preconditioner for regulating a D.C. voltage comprising:
   a current source for producing current;
   output means responsive to said current across which said regulated D.C. voltage is applied;
   switch means for diverting current away from said output means;
   control means responsive to a control signal for controlling said switch means; and
   sensing means for producing said control signal, said control signal including a sensed signal representing current flow through said switch means and a varying offset based on the regulated D.C. voltage.

7. The preconditioner of claim 6, wherein said current source includes inductor means controlled by said switch means for supplying the current to said output means and said output means includes at least one capacitor across which said regulated D.C. voltage is applied.

8. The preconditioner of claim 6, wherein said offset is directly proportional to said regulated D.C. voltage.

9. The preconditioner of claim 6, wherein said sensing means includes zener diode means having a cathode which varies between a low voltage level and a high voltage level based on the regulated D.C. voltage at said output means.

10. The preconditioner of claim 9, wherein the voltage at said cathode is directly proportional to said regulated D.C. voltage.

11. The preconditioner of claim 6, wherein the magnitude of said offset varies between two levels.

12. A ballast for a discharge lamp, comprising:
    an input terminal for connection to a source of voltage for the lamp ballast,
    a current source coupled to said input terminal and operative to produce a current,
    output means for connection to said discharge lamp and responsive to said current to provide an output voltage,
    switch means for controlling the current supplied to said output means,
    power factor control means responsive to a control signal for controlling the switch means so as to control the power factor of said ballast; and
    sensing means for producing said control signal which includes a sensed signal added to a varying offset that varies as a function of the output voltage.

13. The ballast of claim 12, wherein said output voltage is a DC voltage and said offset increases when said D.C. voltage output rises above a predetermined voltage level.

14. The ballast of claim 13, wherein said offset varies between a low level and a high level at said predetermined voltage level.

15. The ballast of claim 14, wherein said high level is approximately at least five times greater in magnitude than said low level.

16. The ballast of claim 12, wherein said sensed signal includes a first component that represents a current that flows only through said switch means and a second component that represents a current from said input terminal.

17. A method for operating a switch mode power supply having a current source, switch means and output means, comprising:
   providing an output voltage at said output means responsive to current supplied from said current source;
   conditioning current supplied to said output means based on at least the switching frequency of said switch means; and
   controlling conditioning by said switch means based on a control signal which includes a sensed signal added to a varying offset, said offset varying based on the output voltage, and wherein said sensed signal represents current flow through said switch means.

18. A method of regulating a D.C. voltage in a ballast having a current source, switch means, control means and output means, comprising:
   producing said D.C. voltage at said output means in response to current supplied thereto from said current source;
   diverting current away from said output means based on said switch means; and
   controlling said switch means based on the control means which is responsive to a control signal which includes a sensed signal and a varying offset, said offset being variable as a function of the DC voltage at said output means, and wherein said sensed signal represents current flow through said switch means.

19. A method of maintaining a relatively constant power factor for a ballast which includes a current source, output means and switch means, said method comprising:
   producing an output voltage at said output means responsive to current supplied by said current source,
   producing a control signal which includes a sensed signal added to a varying offset,
   adjusting the power factor of said ballast in response to said control signal, and
   conditioning current supplied to said output means based on said switching means, wherein said sensed signal represents current flow through said switch means and wherein said offset is varied based on the output voltage of said output means.

20. A regulated power supply with power factor control comprising:
   an input terminal for connection to a source of unregulated supply voltage,
   at least one output terminal for connection to a load,
   a supply capacitor coupled to the one output terminal,
   a converter circuit coupled between said input terminal and said one output terminal for producing a load current and a regulated voltage at the one output terminal, said converter circuit including at least an inductor, a diode and a controlled semiconductor switch,
   switch control means responsive to a control signal thereby to control the switching of said semiconductor switch in a manner so as to control current flow through said inductor, and
   means for deriving a first signal component of said control signal indicative of a current flowing through said semiconductor switch and a second signal component of said control signal comprising an active offset signal that varies as a function of the voltage at said output terminal.

21. A power supply as claimed in claim 20 wherein said deriving means produces an offset signal of sufficient magnitude to significantly affect switching of the semiconductor switch only during a no-load or light load condition.

22. A power supply as claimed in claim 20 further comprising means responsive to an input current flowing through said input terminal for deriving a third signal component of said control signal which is operative to cause the switch control means to switch on the semiconductor switch when the input current is approximately at zero level.

23. A power supply as claimed in claim 20 wherein said deriving means produces an offset signal of sufficient magnitude to significantly affect switching of the semiconductor switch at a predetermined voltage threshold level of the supply capacitor voltage.

24. A power supply as claimed in claim 20 wherein said first signal component is indicative only of a current flowing through said semiconductor switch and said control signal is substantially independent of the source of supply voltage whereby the switch control means adjusts the switching frequency of the semiconductor switch and produces asynchronous operation thereof.

25. A power supply as claimed in claim 20 wherein said deriving means derives third and fourth signal components of said control signal indicative of an input current flowing through said input terminal and of an input voltage at said input terminal, respectively.

* * * * *